US008538676B2

(12) United States Patent
Wuersch et al.

(10) Patent No.: US 8,538,676 B2
(45) Date of Patent: Sep. 17, 2013

(54) MOBILE GEOGRAPHIC INFORMATION SYSTEM AND METHOD

(75) Inventors: Markus Wuersch, Portland, ME (US); David Caduff, Zurich (SE)

(73) Assignee: Ipointer, Inc., Bakersfield, CA (US)

( * ) Notice: Subject to any disclaimer, the term of this patent is extended or adjusted under 35 U.S.C. 154(b) by 0 days.

(21) Appl. No.: 11/479,283

(22) Filed: Jun. 30, 2006

(65) Prior Publication Data

US 2008/0162032 A1 Jul. 3, 2008

(51) Int. Cl.

*G01C 21/00* (2006.01)
*G01C 21/34* (2006.01)
*G08G 1/123* (2006.01)

(52) U.S. Cl.

USPC .......... 701/400; 701/426

(58) Field of Classification Search

USPC .......... 701/200, 201, 206, 207, 213, 400, 701/408, 426, 438

See application file for complete search history.

(56) References Cited

U.S. PATENT DOCUMENTS 5,214,757 A 5/1993 Mauney et al.
5,470,233 A 11/1995 Fruchterman et al.
5,592,382 A * 1/1997 Colley .......... 701/467
5,628,050 A 5/1997 McGraw et al.
5,633,946 A 5/1997 Lachinski et al.
5,745,113 A 4/1998 Jordan et al.
5,771,169 A 6/1998 Wendte
5,848,373 A 12/1998 DeLorme et al.
6,070,167 A 5/2000 Qian et al.
6,144,318 A * 11/2000 Hayashi et al. .......... 340/995.19
6,173,239 B1 1/2001 Ellenby
6,222,482 B1 4/2001 Gueziec
6,247,019 B1 6/2001 Davies
6,262,741 B1 7/2001 Davies
6,282,362 B1 8/2001 Murphy et al.

(Continued)

FOREIGN PATENT DOCUMENTS

WO WO-2008/005795 1/2008
WO WO-2009/111578 9/2009

(Continued)

OTHER PUBLICATIONS

International Search Report for PCT/US2007/072358, mailed Nov. 30, 2007, 3 pages.

(Continued)

*Primary Examiner* — Thomas Tarcza
*Assistant Examiner* — Imran Mustafa
(74) *Attorney, Agent, or Firm* — Wilmer Cutler Pickering Hale and Dorr LLP

(57) ABSTRACT

The present invention includes a mobile geographic information system and method. The method includes the steps of inputting data representing a user position, defining a first circularly spatially extended point (CSEP) about the user in response to the user position data, defining a first waypoint associated with a geographic feature, defining a second CSEP about the first waypoint, and providing a qualitative user position relative to the geographic feature in response to a predetermined topological relationship between the first CSEP and the second CSEP. The mobile geographic information system includes a database containing geographic information including information related to a geographic feature and information relating to a first waypoint associated with the geographic feature and a mobile device in communication with the database, wherein the mobile device includes a controller and a position sensor for determining a user position associated with the mobile device.

17 Claims, 10 Drawing Sheets

(56) References Cited

U.S. PATENT DOCUMENTS

| | | | |
|---|---|---|---|
| 6,334,087 B1 | 12/2001 | Nakano et al. | |
| 6,381,540 B1 | 4/2002 | Beason et al. | |
| 6,385,541 B1 | 5/2002 | Blumberg et al. | |
| 6,456,938 B1 | 9/2002 | Barnard | |
| 6,486,831 B1 | 11/2002 | Martorana et al. | |
| 6,496,776 B1 | 12/2002 | Blumberg et al. | |
| 6,504,541 B1 | 1/2003 | Liu et al. | |
| 6,532,304 B1 | 3/2003 | Liu et al. | |
| 6,606,542 B2 | 8/2003 | Hauwiller et al. | |
| 6,708,109 B1 | 3/2004 | Pradhan et al. | |
| 6,732,120 B1 | 5/2004 | Du | |
| 6,795,768 B2 | 9/2004 | Bragansa et al. | |
| 6,799,115 B1 | 9/2004 | Childs et al. | |
| 6,847,883 B1 | 1/2005 | Walmsley et al. | |
| 6,879,838 B2 | 4/2005 | Rankin et al. | |
| 6,912,545 B1 | 6/2005 | Lundy et al. | |
| 6,930,715 B1 | 8/2005 | Mower | |
| 6,965,828 B2 | 11/2005 | Pollard | |
| 6,982,697 B2 | 1/2006 | Wilson et al. | |
| 6,983,202 B2 | 1/2006 | Sanqunetti | |
| 7,031,875 B2 | 4/2006 | Ellenby et al. | |
| 7,072,665 B1 | 7/2006 | Blumberg et al. | |
| 7,174,301 B2 | 2/2007 | Florance et al. | |
| 7,245,923 B2 | 7/2007 | Frank et al. | |
| 7,295,922 B2 | 11/2007 | Simon Robert et al. | |
| 7,418,341 B2 | 8/2008 | Wuersch et al. | |
| 2001/0044309 A1 | 11/2001 | Bar et al. | |
| 2002/0045455 A1* | 4/2002 | Spratt | 455/456 |
| 2002/0140745 A1 | 10/2002 | Ellenby et al. | |
| 2002/0155844 A1 | 10/2002 | Rankin et al. | |
| 2002/0165662 A1* | 11/2002 | Maruyama et al. | 701/200 |
| 2003/0083063 A1 | 5/2003 | Wang et al. | |
| 2003/0149557 A1 | 8/2003 | Cox et al. | |
| 2004/0002303 A1* | 1/2004 | Hirokawa | 455/11.1 |
| 2004/0021780 A1 | 2/2004 | Kogan | |
| 2004/0024522 A1 | 2/2004 | Walker et al. | |
| 2004/0044472 A1* | 3/2004 | Tsuge et al. | 701/210 |
| 2004/0048620 A1* | 3/2004 | Nakahara et al. | 455/456.1 |
| 2004/0078278 A1 | 4/2004 | Dauga et al. | |
| 2004/0087294 A1 | 5/2004 | Wang | |
| 2004/0145591 A1 | 7/2004 | Luo et al. | |
| 2005/0043881 A1* | 2/2005 | Brulle-Drews et al. | 701/200 |
| 2005/0075119 A1* | 4/2005 | Sheha et al. | 455/456.6 |
| 2005/0108646 A1 | 5/2005 | Willins et al. | |
| 2005/0125145 A1 | 6/2005 | Sakashita et al. | |
| 2005/0130671 A1 | 6/2005 | Frank et al. | |
| 2005/0165548 A1 | 7/2005 | Persson | |
| 2005/0288858 A1 | 12/2005 | Amer et al. | |
| 2006/0041375 A1 | 2/2006 | Witmer et al. | |
| 2006/0103590 A1 | 5/2006 | Divon | |
| 2006/0208927 A1 | 9/2006 | Poor et al. | |
| 2006/0224303 A1* | 10/2006 | Hayashi | 701/201 |
| 2006/0270460 A1 | 11/2006 | Konkka et al. | |
| 2006/0294062 A1 | 12/2006 | Folchetti et al. | |
| 2007/0049313 A1 | 3/2007 | Grams et al. | |
| 2007/0050129 A1 | 3/2007 | Salmre | |
| 2007/0055441 A1 | 3/2007 | Retterath et al. | |
| 2007/0150179 A1 | 6/2007 | Pinkus et al. | |
| 2007/0288196 A1 | 12/2007 | Frank et al. | |
| 2008/0049016 A1 | 2/2008 | Shearer | |
| 2008/0070684 A1 | 3/2008 | Haigh-Hutchinson | |
| 2008/0109758 A1 | 5/2008 | Stambaugh | |
| 2008/0114564 A1 | 5/2008 | Ihara | |
| 2008/0133488 A1 | 6/2008 | Bandaru et al. | |
| 2008/0162032 A1 | 7/2008 | Wuersch et al. | |
| 2009/0227269 A1 | 9/2009 | Frank et al. | |
| 2010/0303293 A1 | 12/2010 | Caduff | |
| 2010/0303339 A1 | 12/2010 | Caduff | |
| 2010/0306200 A1 | 12/2010 | Frank et al. | |
| 2010/0306707 A1 | 12/2010 | Caduff | |

FOREIGN PATENT DOCUMENTS

| | | |
|---|---|---|
| WO | WO-2010/075455 | 7/2010 |
| WO | WO-2010/075456 | 7/2010 |
| WO | WO-2010/075466 | 7/2010 |
| WO | WO-2010/078455 | 7/2010 |

OTHER PUBLICATIONS

"Refined Route Instructions Using Topological Stages of Closeness" by Markus Wuershch and David Caduff, presented at the Geological Information Science Conference in Munster, Germany on Sep. 20-23, 2006 (www.giscience.org).

Egenhofer, M. J. et al., "A Mathematical Framework for the Definition of Topological Relationships", *Proceedings of the 4th International Symposium on Spatial Data Handling*, Zurich, Switzerland, Jul. 23-27, 1990, pp. 803-813.

Egenhofer, M.J. et al., "Beyond Desktop GIS A Family of Portable Spatial Information Technologies", *In GIS PlaNET*, Lisbon, Portugal, 1998, 4 pages.

Egenhofer, M.J., "Categorizing Binary Topological Relations Between Regions, Lines, and Points in Geographic Databases", National Center for Geographic Information and Analysis and Department of Surveying Engineering, Department of Computer Science, University of Maine, Orono, Maine, 28 pages, 1990.

International Search Report and Written Opinion of the Internatinal Searching Authority, the United States Patent and Trademark Office, for International Application No. PCT/US2009/069860, dated Mar. 2, 2010, 7 pages.

International Search Report and Written Opinion of the International Searching Authority, the European Patent Office, for International Application No. PCT/US2007/072358, dated Nov. 30, 2007, 8 pages.

International Search Report and Written Opinion of the International Searching Authority, the United States Patent and Trademark Office, for International Application No. PCT/US2009/069312, dated Mar. 4, 2010, 8 pages.

International Search Report and Written Opinion of the International Searching Authority, the United States Patent and Trademark Office, for International Application No. PCT/US2009/069313, dated Feb. 19, 2010, 8 pages.

International Search Report and Written Opinion of the International Searching Authority, the United States Patent and Trademark Office, for International Application No. PCT/US2009/069327, dated Mar. 4, 2010, 7 pages.

International Search Report and Written Opinion, International Patent Application No. PCT/US09/36053, mailed Apr. 22, 2009, 6 pages.

Wuershch, et al., "Refined Route Instructions Using Topological Stages of Closeness," presented at the Geological Information Science Conference in Munster, Germany on Sep. 20-23, 2006 (www.giscience.org), pp. 31-41, 12 pages.

* cited by examiner

MOBILE GEOGRAPHIC INFORMATION SYSTEM AND METHOD

BACKGROUND AND SUMMARY OF THE RELATED ART

1. Field of the Invention

The present invention relates generally to systems, methods and devices for determining geographic information, and specifically to distributed systems, methods and devices for interpreting spatial and geographic data and presenting said data to a user.

2. History of the Related Art

Recent years have seen a proliferation in the field of navigation and way-finding, particularly as applied to automotive travel. Many new vehicles are equipped with navigation devices for aiding the operator in his or her travels. Although these developments are a welcome improvement over maps, they still suffer from limitations imposed by the very nature of automotive travel. For example, routes for car navigation are confined to street networks and any instruction given to navigators is always with reference to the underlying network. The ride from Boston to New York, for instance, takes place on the different types of street networks. Automotive networks include a number of physical constraints on the movement of vehicles, such as one-way streets, on-ramps, exit ramps, and the like. Moreover, automotive networks contain a number of rules, such as traffic lights, speed limits and other traffic laws. These rules and constraints, together with the street network provide a forgiving system with regard to user and data inaccuracies. As long as route instructions are not given too late, user location and data inaccuracies do not deter drivers from their chosen route.

Pedestrian navigation, however, is not confined to a network of streets, but includes all passable areas, such as walkways, squares, and open areas, within or outside buildings. A pedestrian decision point is not specific to a junction between two or more streets, but rather it is a function of the actual position of the pedestrian. This systemic feature of pedestrian navigation results from the natural freedom associated with walking. Pedestrians are free to choose their own path, get on and off street networks anywhere and anytime, take shortcuts, or cross squares. Similar navigation problems are associated with aircraft and vessels, which can more freely choose and select their route without the confines of a street or highway network.

Because of these difficulties associated with pedestrian navigation, many pedestrians, pilots and ship navigators still rely on maps as a route-finding tool. Maps an adequate means for understanding spatial environments, as well as for performing tasks such as way finding, trip-planning, and location-tracking. However, static traditional maps have several disadvantages. First, maps necessarily have a fixed orientation. That is, the map always faces in one direction (typically north). A user, however, may be facing any direction at any given moment. Hence, in order to understand the map, a user needs to perform some kind of rotation, either of himself or of the map to align his frame of reference with the map's frame of reference. This process puts an immense cognitive load on the users, because it is not always intuitive and may present considerable difficulties, especially in cases of complex, uniform or unfamiliar spatial environments.

Maps are also hindered by the fact that they have a fixed scale that cannot be changed to a different granularity level. This limitation is one of the most restrictive aspects of paper maps. The scale determines the level of zooming into a spatial environment, as well as the level of detail and the type of information that is displayed on a map. Users, however, need to constantly change between different scales, depending on whether they want a detailed view of their immediate surrounding environment or a more extensive and abstract view in order to plan a trip or find a destination. Current solutions to the problem include tourist guides that comprise maps of a specific area at many different scales. Tourist guides, however, are bulky books, difficult to carry around, and search time is considerable as they typically consist of hundreds of pages.

Maps also fail to accommodate rapid changes in our natural and urban environments. On a map, all spatial environments and the objects that they encompass, whether artificial or natural, are displayed statically although they are actually dynamic and change over time. Artificial spatial objects, such as buildings, may get created, destroyed, or extended, while others, such as land parcels, may merge, shrink, or change character (e.g., when a rural area is developed). The same holds true for natural features, for instance, a river may expand or shrink because of a flood. The static 2-dimensional map is restricted to representing a snapshot in time and the information on it may soon become obsolete, or worse, misleading.

Attempts at electronic maps or geographic information systems have also proven unworkable for practical reasons. One deficiency found in current geographic information systems is that the systems are purely quantitative. That is, any feedback provided to the user is typically in a quantitative measurement of distance, such as for example, instructing a user to turn right in fifty meters. While some users may have an intuitive understanding of space and measurement, other users are likely to become more confused and frustrated as they attempt to determine the relationship between the real space in front of them and the quantitative measure of it provided by the geographic information system. As such, the state of the art lacks an integrated geographic information system that can provide information to a user in a manner that is easily accessible, intuitively understood and qualitative in nature.

SUMMARY OF THE PRESENT INVENTION

Accordingly, the present invention includes a mobile geographic information system and method that provides information to a user in a manner that is easily accessible, intuitively understood and qualitative in nature. The method of the present invention provides a qualitative user position relative to a geographic feature in response to a predetermined topological relationship. One step of the method recites inputting data representing a user position, wherein the user position is determined by associating a user position with the position of a mobile device. In another step, the method recites defining a first circularly spatially extended point (CSEP) about the user in response to the user position data, as discussed more fully below. The method defines a first waypoint associated with a geographic feature, and the method further recites defining a second CSEP about the first waypoint, also discussed more fully below. The method of the present invention recites providing a qualitative user position relative to the geographic feature in response to a predetermined topological relationship between the first CSEP and the second CSEP. Unlike the prior art discussed above, which is adapted to provide quantitative measures of the distance between two or more objects of interest, the method of the present invention provides a user with a qualitative measure of the degree of closeness to the geographic feature. The particulars of the qualitative output of the preferred method are discussed more fully below with reference to the Figures.

The present invention also includes a mobile geographic information system. The mobile geographic information system includes a database containing geographic information including information related to a geographic feature and information relating to a first waypoint associated with the geographic feature and a mobile device in communication with the database. The mobile device includes a controller communicable with the database and a position sensor for determining a user position associated with the mobile device. The mobile device may include any number of devices, such as a personal digital assistant (PDA), a laptop computer, a cellular or digital wireless telephone or smart telephone, a portable music player, or any other suitable electronic device. The controller is adapted to receive information denoting the user position and, in combination with the geographic information relating to the geographic feature and the first waypoint, the controller is adapted to instruct the user as to a qualitative relative position of the mobile device and the geographic feature in response to a predetermined topological relationship between the user position and the first waypoint associated with the geographic feature.

These and other features and aspects of the present invention are more clearly delineated in the detailed description of the preferred embodiments, which includes references to the following Figures.

DESCRIPTION OF THE PREFERRED EMBODIMENTS

The following description of the preferred embodiments of the invention is not intended to limit the invention to this preferred embodiment, but rather to enable any person skilled in the mobile geographic information systems to make and use this invention.

Figure 1:
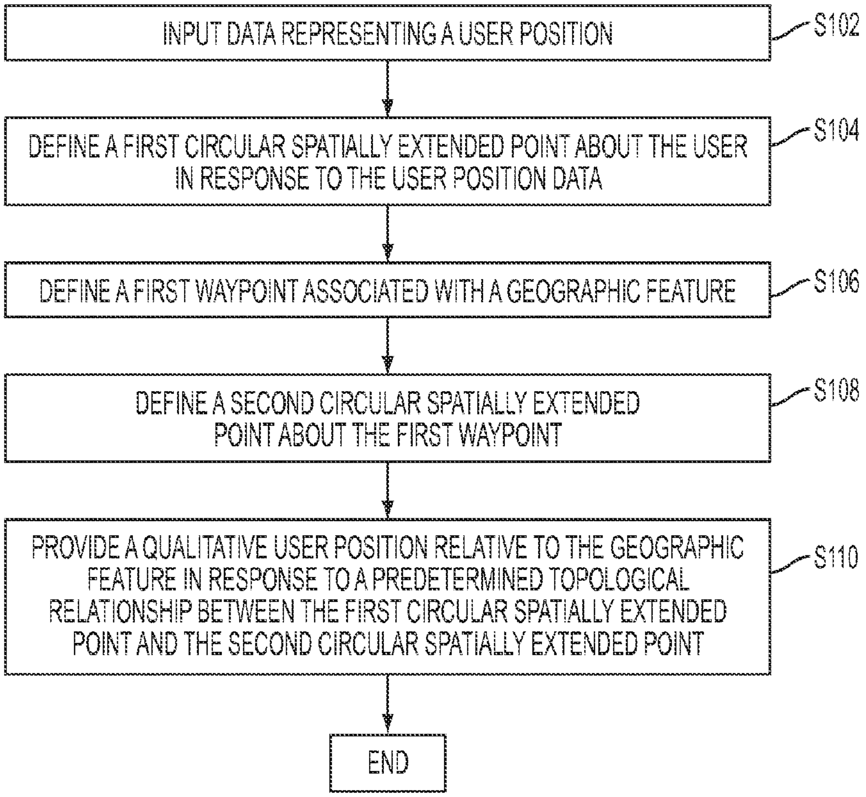
FIG. 1 is a flow chart depicting a method for providing geographic information in accordance with the present invention.

As shown in the flowchart of FIG. 1, the preferred method of the present invention provides a qualitative user position relative to a geographic feature in response to a predetermined topological relationship. Step S102 of the preferred method recites inputting data representing a user position. As described more fully below, the user position is determined by associating a user position with the position of a mobile device. The mobile device preferably includes location-determining means, which may be integrated therein or may be performed remotely. For example, the mobile device may include a global positioning system (GPS) or other suitable location determining hardware. Alternatively, the mobile device may include an antenna or receiver that functions to communicate with one or more wireless transmission towers. In this example, the location determining means may include triangulation of the position of the mobile device through one or more wireless transmission towers. Other location determining means include those known in the art, such as RADAR, LIDAR, SONAR and the like, as well as manual input of a user location by a user.

In step S104, the method recites defining a first circularly spatially extended point (CSEP) about the user in response to the user position data, as discussed more fully below. In step S106, the preferred method defines a first waypoint associated with a geographic feature. As used herein, the term waypoint refers to an abstract mathematical reference for a location, area or other geographic feature of interest. Waypoints may be associated with larger landmarks such as buildings, parks, lakes, rivers and other points of interest. Alternatively, waypoints be associated with relatively smaller markers such as streets, intersections, signposts, pedestrian walkways and the like. In preferred embodiments, the first waypoint may be a fixed feature such as the type described above. Alternatively, the first waypoint may be mobile relative to the user and to other waypoints. In step S108, the method recites defining a second CSEP about the first waypoint, also discussed more fully below.

In step S110, the preferred method recites providing a qualitative user position relative to the geographic feature in response to a predetermined topological relationship between the first CSEP and the second CSEP. Unlike the prior art, which is adapted to provide quantitative measures of the distance between two or more objects of interest, step S110 of the present invention provides a user with a qualitative measure of the degree of closeness to the geographic feature. In particular, as the scaling of maps is often difficult to interpret, a user may not readily understand quantitative measures of distance, i.e. as measured in miles, meters or feet. The preferred method, however, provides a user with a qualitative description of his or her position relative to the geographic feature, i.e. distal, close, closer, arrival and the like. The particulars of the qualitative output of the preferred method are discussed more fully below.

Figure 2:
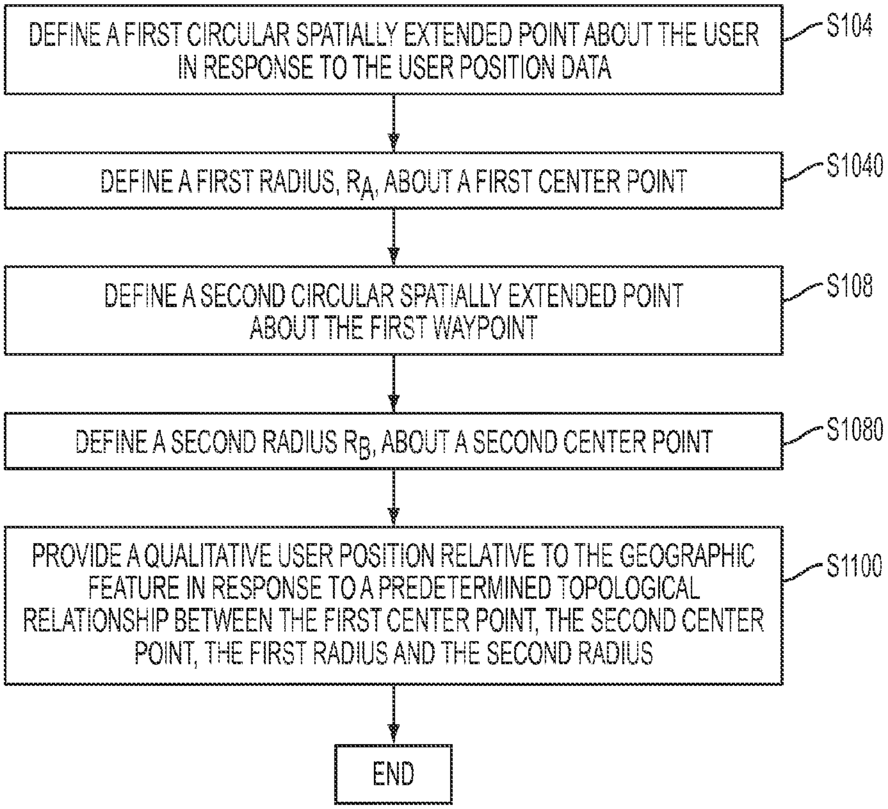
FIG. 2 is a flow chart depicting a method for providing geographic information in accordance with the present invention.

As shown in the flowchart of FIG. 2, the qualitative relationship between the first CSEP and the second CSEP is a function of the relative center points and the radii of the CSEP's. In step S104, as noted above, the method recites defining a first CSEP about the user in response to the user position data. In order to do so, step S1040 of the method recites defining a first radius $R_A$ about a first center point. The first center point is defined as the center of the CSEP, the radius of which, $R_A$, may be determined or fixed according to the selected method of determining the user location. For example, if the user is employing a mobile device with integrated GPS, then the CSEP will include the first center point and a radius defined by the error rate of the GPS. Accordingly, if the GPS error is +/−2.5 meters, then the radius $R_A$ will be 2.5 meters in length and the first center point will be defined as the center of the user position including error as registered by the GPS.

As noted above, step S108 recites defining a second CSEP about the first waypoint. In step S1080, the method recites defining a second radius $R_B$ about a second center point. If the first waypoint is fixed, then the second center point is also fixed and may be determined by GPS, triangulation, or any other suitable cartographic methods. Likewise, if the first waypoint is fixed, then the second radius $R_B$ may be fixed at a predetermined distance based upon its proximity to other waypoints, its relative size compared to a user and other waypoints, or any other suitable metric. For example, if the first waypoint is an intersection or a street sign, then the second radius $R_B$ would preferably be of the same order of magnitude as that of the first radius $R_A$. However, if the first waypoint is a building or a park, then necessarily the second radius $R_B$ must be at least large enough to contain the entire geographic feature defined by the first waypoint. Alternatively, if the first waypoint is mobile relative to the user and another waypoint, then the second center point and the second radius $R_B$ are preferably determined as described above for the first CSEP.

Figure 3:
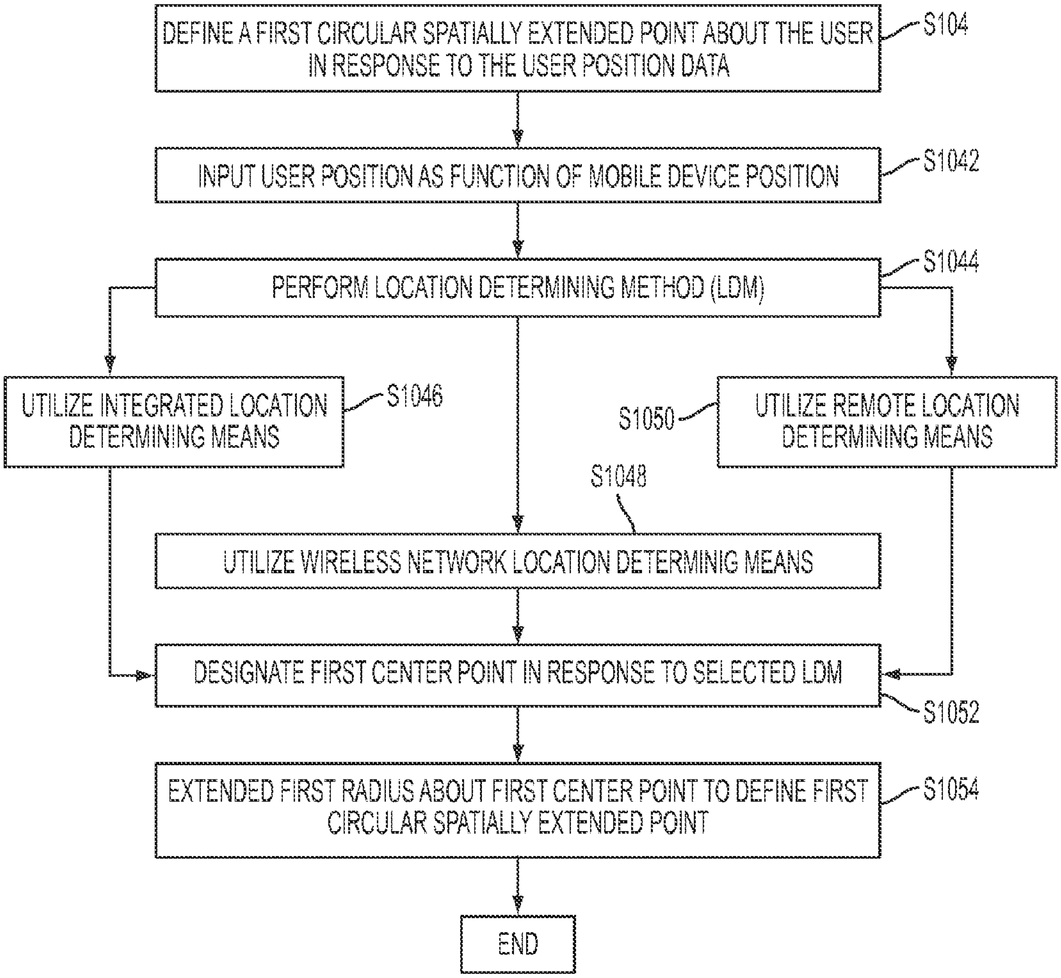
FIG. 3 is a flow chart depicting a method for providing geographic information in accordance with the present invention.

As noted above, the first CSEP is defined as a function of the user position, which in turn depends upon the mobile device and the location determining method employed by the mobile device. Referring to FIG. 3, step S104 again recites defining a first CSEP about the user in response to the user position data. The user position data is acquired in step S1042, which recites inputting the user position as a function of the mobile device position. The mobile device may include any number of devices, such as a personal digital assistant (PDA), a laptop computer, a cellular or digital wireless telephone or smart telephone, a portable music player, or any other suitable electronic device. As previously noted, the position of the mobile device is determined in accordance with an associated location determining method, which is performed in step S1044. The location determining method is in part a function of the hardware included in the mobile device. Thus, a preferred mobile device may include a GPS either integrated or accessible via a wireless communication means known in the art. Alternatively, the preferred mobile device may include an antenna for communicating with one or more fixed transmission towers, from which the position of the mobile device can be readily determined through triangulation.

Accordingly, in step S1046, the method recites utilizing an integrated location determining method, for example internal GPS as noted above. In step S1048, the method recites utilizing wireless network location determining means, for example by triangulating the position of a wireless enabled device such as a cellular, digital or smart telephone. Similarly, the position of a laptop computer having WiFi capabilities can be readily triangulated using fixed WiFi stations within a given range. In step S1050, the method recites utilizing remote location determining means, which may include traditional location means such as RADAR, LIDAR and SONAR, which are useful in the location of mobile users, aircraft and vehicles. Alternatively, the location determining means may include a user input feature, which allows a user to input his or her location into the mobile device, from which the first CSEP can be derived according to the methodology described above.

Following execution of the location determining method, step S1052 recites designating a first center point in response to the user location as determined above. In step S1054, the method recites extending the first radius $R_A$ about the first center point to define the first CSEP. As previously noted, the dimension of the first radius $R_A$ is typically calculated as a function of the error in the determination of the user position. As such, depending upon the error inherent in the selected location determining method, the first radius $R_A$ may vary accordingly. Alternatively, the dimension of the first radius $R_A$ may be user defined or dynamically variable depending upon the larger environment in which the user finds himself or herself. For example, in a rural environment, a user may select or require a larger first radius $R_A$, which would result in a more regular interaction with any waypoints in the surrounding area. Conversely, if a user is in an urban environment having a large density of waypoints, then the user would select or require a minimum value for the first radius $R_A$ in order to ensure efficient and useful interaction with the surrounding waypoints. Alternatively, the first radius $R_A$ may be dynamically variable as a function of the user's speed, which can be computed readily from the known change in position of the user over a predetermined period of time.

Figure 4:
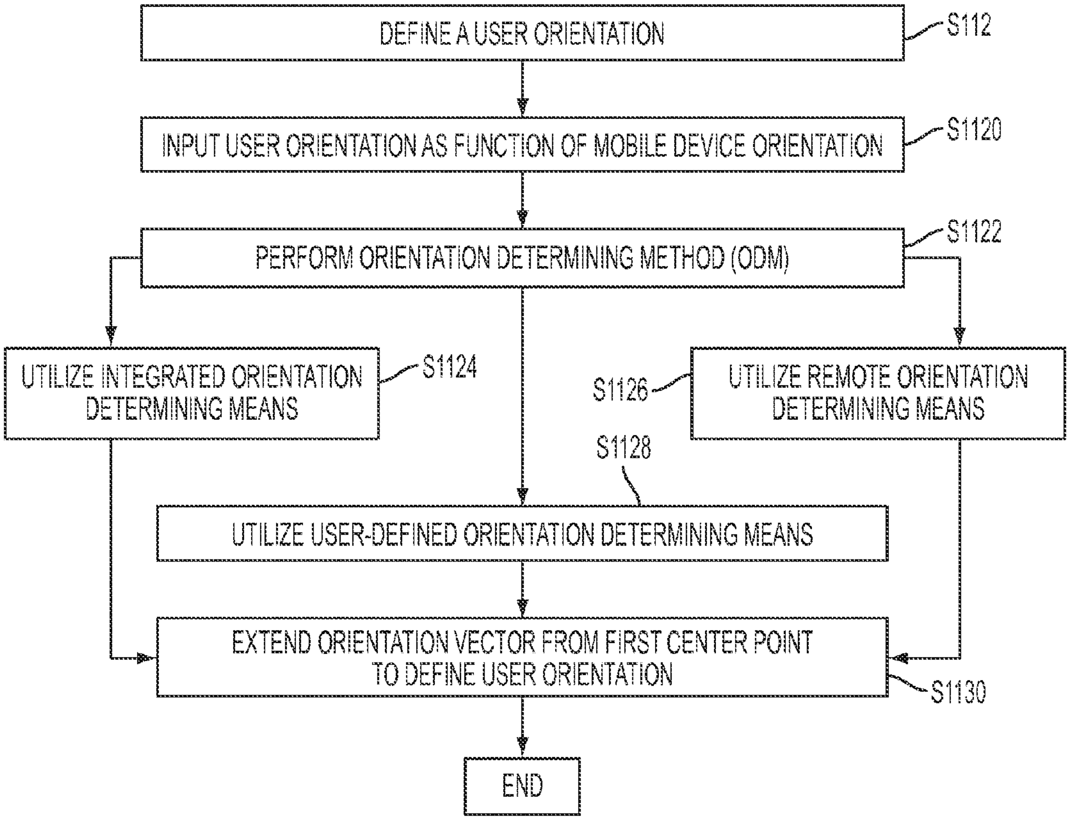
FIG. 4 is a flow chart depicting a method for providing geographic information in accordance with the present invention.

The preferred methodology of the present invention is readily adaptable for wayfinding and navigation in both urban and rural environments. To that end, the preferred method also includes means for determining a user orientation. As shown in FIG. 4, step S112 of the preferred method recites defining a user orientation. User orientation is a function of mobile device orientation, which is input in step S1120. In step S1122, the method recites performing an orientation determining method, which may include any number of alternative methods and means. A first alternative is included in step S1124, which recites utilizing integrated orientation determining means, such as for example a compass or other device integrated into the mobile device. A second alternative is included in step S1126, which recites utilizing remote orientation determining means, such as for example a heading or direction determinable from GPS position data or wireless triangulation position data. Thirdly, the orientation determining means may be user-defined, as shown in step S1128, in which case the user directly inputs his or her orientation into the mobile device. In step S1130, the method recites extending an orientation vector from the first center point to define the user orientation. In one alternative embodiment, the orientation vector may be displayed for the user on his or her mobile device, thus providing a visual indicator of the user's orientation and/or direction of travel. In another alternative embodiment, the orientation vector as displayed to the user may have a dynamically variable appearance that changes as a function of the user's speed. Thus, if a user is quickly moving through a park or neighborhood, the orientation vector as presented will be relatively large. Conversely, if the user is standing still and merely rotating the mobile device about his or her position, then the orientation vector as presented will be relatively small.

In another preferred embodiment, the methodology of the present invention functions to aid a user in navigating from a location to or near a geographic feature or location of interest.

Figure 5:
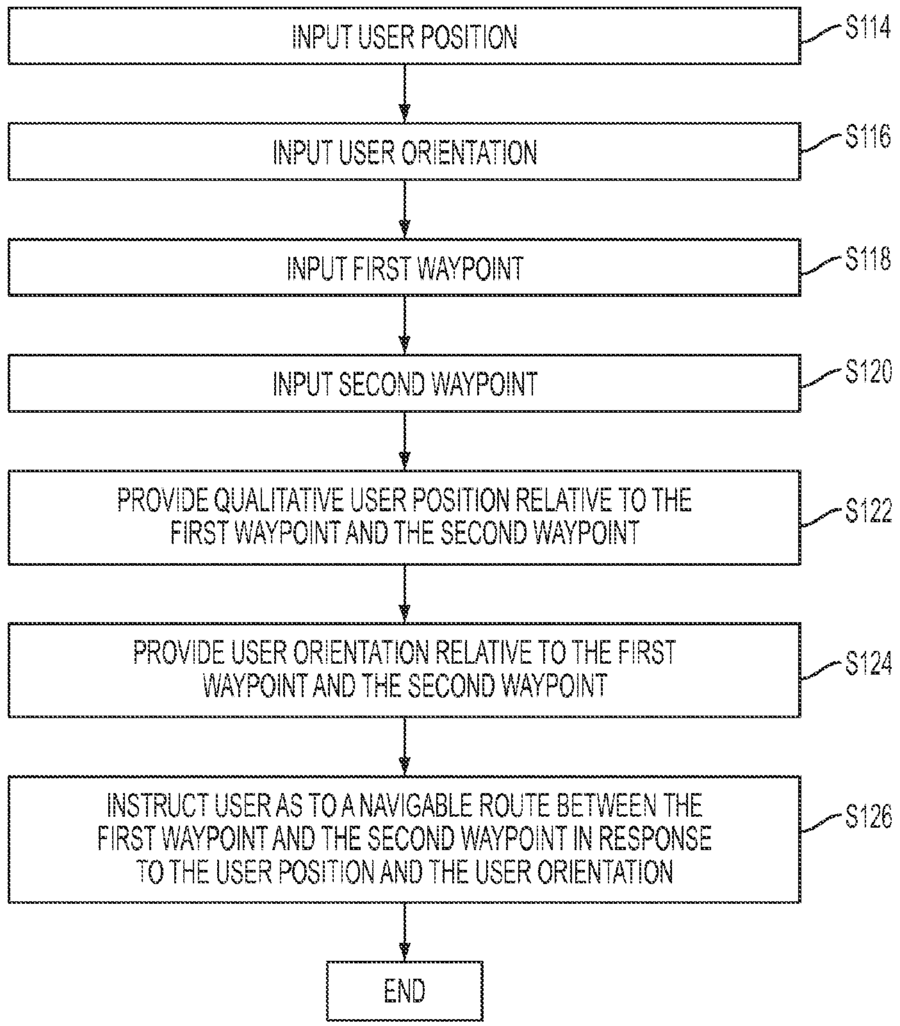
FIG. 5 is a flow chart depicting a method for providing geographic information in accordance with the present invention.

As shown in the flowchart of FIG. 5, this embodiment of the present invention utilizes a second waypoint in order to direct a user through the qualitative feedback discussed above. In step S114, the method recites inputting the user position, which defines a first CSEP, as defined above with regard to the mobile device. In step S116, the method recites inputting the user orientation, which is preferably accomplished according to the methodology described above. In step S118, the method recites inputting a first waypoint, which defines a second CSEP, as defined above. In step S120, the method recites inputting a second waypoint, which defines a third CSEP. As noted above, the radii of the first and second CSEPs may be distinct or substantially identical. Similarly, the radius of the third CSEP that is defined about the second waypoint may be distinct from or substantially identical in dimension to either of the first or second radii. Thus for example, if the first waypoint is an intersection or street sign, and the second waypoint is a building, monument or other landmark, then the respective waypoints will have substantially distinct radii in order to aid in determining the user's qualitative positions relative thereto. Conversely, if both the first and second waypoints are of similar physical dimensions, such as intersections or street signs, then their respective radii may be substantially identical to aid the user in qualitative navigation between the two waypoints.

In step S122, the method recites providing a qualitative user position relative to the first waypoint and the second waypoint. Preferably, this step is performed in response to a predetermined topological relationship between the first CSEP, the second CSEP and the third CSEP, as described further herein. In step S124, the method recites providing a user orientation relative to the first waypoint and the second waypoint. Preferably, this step is accomplished by comparing the relative positions of the user, the first waypoint and the second waypoint and the user orientation, as defined above. In step S126, the method recites instructing the user as to a navigable route between the first waypoint and the second waypoint in response to the user position and the user orientation. Accordingly, step S126 functions to provide the user with qualitative position feedback combined with orientation feedback in order to direct the user to, from, and between the first waypoint and second waypoint.

Figure 6:
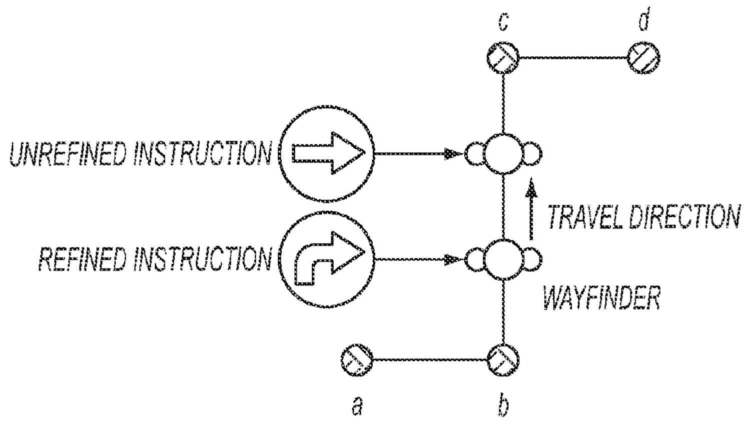
FIG. 6 is a schematic representation of a user being guided between two waypoints according to the system and method of the present invention.

As shown schematically in FIG. 6, the system and method of the present invention are readily adapted to direct a user from a point a to a point d through a series of two or more waypoints, designated c and d in FIG. 6. As the user is moving between points b and c, the present invention provides a refined route instruction, which may be given visually by a bent, curved or otherwise two-dimensional arrow. The refined instruction indicates to the user that he or she must first proceed to the waypoint c prior to turning towards the destination d. By way of comparison, an unrefined instruction might consist merely of a one-dimensional arrow indicating to the user that the destination d is located generally to his or her right. However, pedestrian navigation can be complicated by numerous obstructions, detours and other pitfalls such that a general, unrefined instruction as shown in FIG. 6 is more likely to cause the user to get lost than reach his or her destination. As such, the present invention, through it's use of waypoints in combination with a user orientation instruction, more readily ensures that the user will reach his or her destination by following the most efficient navigable route thereto.

Figure 7:
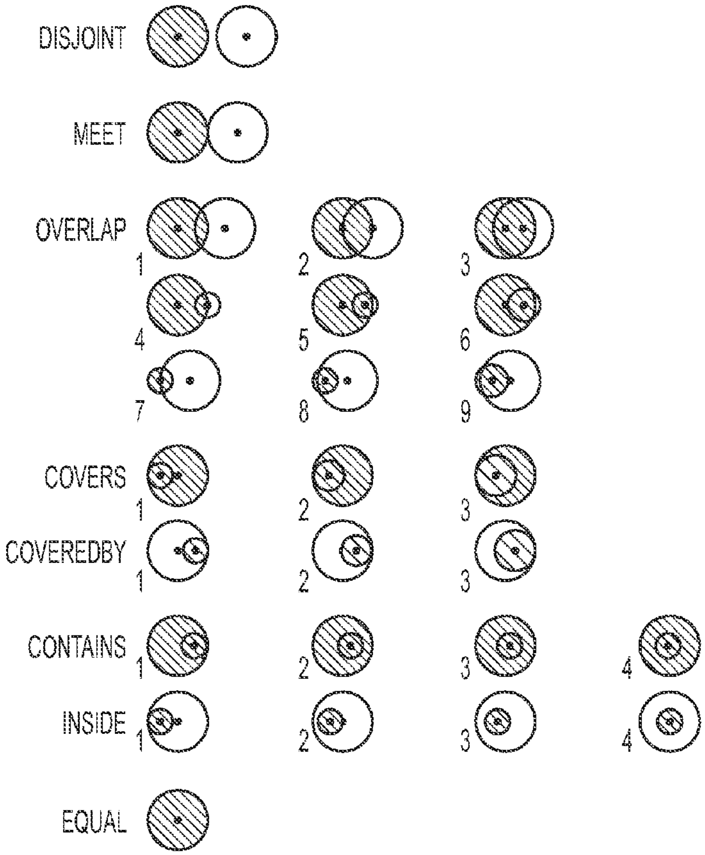
FIG. 7 is a schematic representation of a plurality of topological relations between a first circular spatially extended point and a second circular spatially extended point in accordance with the present invention.

As previously noted, the preferred methodology provides the user with qualitative information regarding his or her position relative to one or more waypoints. In turn, the qualitative information is generated in response to a predetermined topological relationship between the user position, defined by the first CSEP, and the first waypoint, defined by the second CSEP. As shown in FIG. 7, there are twenty-six possible qualitative topological relationships between the first CSEP, which is shaded, and the second CSEP, which is not shaded. The twenty-six qualitative topological relationships can be further classified into eight distinct qualitative measurements of the relative positions of the first CSEP and the second CSEP. These eight qualitative measurements include a disjointed relationship, a meeting relationship, an overlapping relationship, a covering relationship, a covered by relationship, a containing relationship, and inside relationship and an equal relationship.

As previously noted, however, it is possible that the first radius $R_A$ and the second radius $R_B$ will be distinct, thus resulting in differing sizes for the first CSEP and the second CSEP. Therefore, the present invention preferably provides the qualitative assessment of the relative positions of the first CSEP and the second CSEP relative to their respective center points. That is, as the radii of the first CSEP and the second CSEP may be variable, the present invention provides the user with his or her relative position as a function of the aforementioned radii. Accordingly, the twenty-six topological relationships that define the relative positions of the first CSEP and the second CSEP are shown below in Table 1.

TABLE 1

| Topological Relation | Distance $d_{A,B} = f(R_A, R_B)$ | Radius $R_B = f(R_A)$ |
|---|---|---|
| Disjoint | $>(R_A + R_B)$ | Any |
| Meet | $=(R_A + R_B)$ | Any |
| Overlap 1 | $>R_A$ AND $>R_B$ AND $<(R_A + R_B)$ | Any |
| Overlap 2 | $=R_A$ AND $=R_B$ | $=R_A$ |
| Overlap 3 | $<R_A$ AND $<R_B$ | $>½ R_A$ AND $<2 * R_A$ |
| Overlap 4 | $=R_A$ AND $>R_B$ | $<R_A$ |
| Overlap 5 | $<R_A$ AND $>½ R_A$ AND $>R_B$ | $<R_A$ |
| Overlap 6 | $<R_A$ AND $=R_B$ $R_A$ AND $>½ R_A$ | $<R_A$ AND $>½ R_A$ |
| Overlap 7 | $>R_A$ AND $=R_B$ | $>R_A$ |
| Overlap 8 | $>R_A$ AND $<R_B$ | $>R_A$ |
| Overlap 9 | $=R_A$ AND $<R_B$ AND $>½ R_B$ | $>R_A$ AND $<2 * R_A$ |
| Covers 1 | $<R_A$ AND $>½ R_A$ OR $<R_A$ AND $> R_B$ | $<½ R_A$ |
| Covers 2 | $=½ R_A$ AND $=R_B$ | $=½ R_A$ |
| Covers 3 | $<½ R_A$ AND $<R_B$ | $>½ R_A$ AND $<R_A$ |
| Covered by 1 | $>R_A$ AND $>½ R_B$ AND $<R_B$ | $>2 * R_A$ |
| Covered by 2 | $=R_A$ AND $=½ R_B$ | $=2 * R_A$ |
| Covered by 3 | $<R_A$ AND $<½ R_B$ | $<2 * R_A$ AND $>R_A$ |
| Contains 1 | $<R_A$ AND $>R_B$ | $<½ R_A$ |
| Contains 2 | $<½ R_A$ AND $=R_B$ | $<½ R_A$ |
| Contains 3 | $<½ R_A$ AND $<R_B$ | $<R_A$ |
| Contains 4 | o | $<R_A$ |
| Inside 1 | $>R_A$ AND $<R_B$ | $>2 * R_A$ |
| Inside 2 | $=R_A$ AND $<½ R_B$ | $>2 * R_A$ |
| Inside 3 | $<R_A$ AND $<½ R_B$ | $>R_A$ |
| Inside 4 | o | $>R_A$ |
| Equal | o | $=R_A$ |

Referring back to FIG. 7, one will readily appreciate that the twenty-six topological relationships that are possible between the first CSEP and the second CSEP render only eight qualitative respective positions, which are shown in detail below in Table 3. For example, there are nine possible ways in which the first CSEP and the second CSEP can overlap. However distinct these nine possibilities are topologically, the preferred method described herein will provide the user with a single qualitative instruction as to his or her position relative to the first waypoint.

Grouping of the twenty-six possible relations into eight qualitative respective positions depends upon the relative dimensions of the first and second radius. As such the present invention distinguishes between the first CSEP covering the second CSEP and the opposite case. For example, if the first waypoint is defined about a street sign, then the second CSEP might be relatively small compared to the first CSEP. In this instance, the first CSEP would cover the second CSEP as the user approached the first waypoint, resulting in a qualitative instruction to the user according to the methods described herein. However, if the first waypoint is defined about a building or monument, then the second CSEP might be relatively large compared to the first CSEP. In this instance, the first CSEP would be covered by the second CSEP, resulting in a distinct qualitative instruction according to the preferred methods described above. The eight qualitative relative positions as a function of the first and second radii are shown below in Table 2,

TABLE 2

| Group | Size of Radius B | Topological Relations |
|---|---|---|
| A | $o < R_B < ½ R_A$ | Disjoint, meet, overlap 1, 4, 5, covers 1, contains 1, 2, 3, 4 |
| B | $R_B = ½ R_A$ | Disjoint, meet, overlap 1, 4, 5, covers 2, contains 3, 4 |
| C | $½ R_A < R_B < R_A$ | Disjoint, meet, overlap 1, 3, 4, 5, 6, covers 3, contains 3, 4 |
| D | $R_B = R_A$ | Disjoint, meet, overlap 1, 2, 3, equal |
| E | $R_A < R_B < 2R_A$ | Disjoint, meet, overlap 1, 3, 7, 8, 9, covered by 3, inside 3, 4 |
| F | $R_B = 2R_A$ | Disjoint, meet, overlap 1, 7, 8, covered by 2, inside 3, 4 |
| G | $2R_A < R_B$ | Disjoint, meet, overlap 1, 7, 8, covered by 1, inside 1, 2, 3, 4 |

Each group in Table 2, which is ordered according to the relative radii of the CSEP's, can be ordered by the distance between the two CSEPs using Table 1. For example, the disjoint topological relation clearly represents a situation where two CSEPs are further apart than the inside relation, whereas the overlap relation is somewhere in-between disjoint and inside. Table 3 below shows the 26 topological relations between two CSEPs ordered by groups and by stages of closeness, which range from furthest at or near state 1 to closest at or near stage 8. There are 8 degrees of closeness for each group A through G, except for group D, which has only six. For group D, however, the topological relations are matched with the topological relations in other groups that have the same distance between the pivots. Column five is therefore empty. We see that column one, two, and three are the same in every group. Column eight is consistent in that it only contains the topological relations where the two center points of the CESP's coincide. Columns four and six contain all the topological relations where the distance between the center points is the radius of $R_A$ or $R_B$. The table is consistent as well in that any topological relation is in only one column. As such, it is possible to reason about the degree of closeness independent of its group in Table 2, and therefore provide a user with a qualitative relative position, derived from the eight stages of closeness shown below.

TABLE 3

| | Stages of Closeness | | | | | | | |
|---|---|---|---|---|---|---|---|---|
| Group | 1 | 2 | 3 | 4 | 5 | 6 | 7 | 8 |
| A | Disjoint | Meet | Overlap 1 | Overlap 4 | Overlap 5, covers 1, contains 1 | Contains 2 | Contains 3 | Contains 4 |
| B | Disjoint | Meet | Overlap 1 | Overlap 4 | Overlap 5 | Covers 2 | Contains 3 | Contains 4 |
| C | Disjoint | Meet | Overlap 1 | Overlap 4 | Overlap 5 | Overlap 6 | Overlap 3, covers 3, contains 3 | Contains 4 |
| D | Disjoint | Meet | Overlap 1 | Overlap 2 | | Overlap 2 | Overlap 3 | Equal |
| E | Disjoint | Meet | Overlap 1 | Overlap 7 | Overlap 8 | Overlap 9 | Overlap 3, inside 3, covered by 3 | Inside 4 |
| F | Disjoint | Meet | Overlap 1 | Overlap 7 | Overlap 8 | Covered By 2 | Inside 3 | Inside 4 |
| G | Disjoint | Meet | Overlap 1 | Overlap 7 | Overlap 8, covered by 1, inside 1 | Inside 2 | Inside 3 | Inside 4 |

Figure 8:
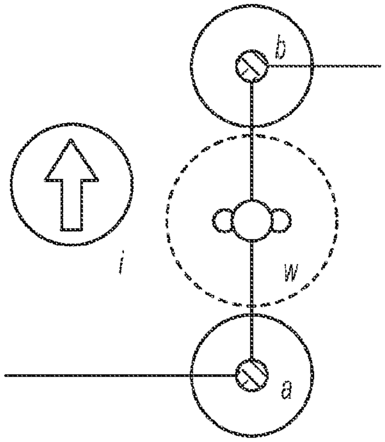
FIG. 8 is a schematic representation of a qualitative instruction being provided to a user in response to the user position relative to one or more waypoints in accordance with the present invention.
Figure 9:
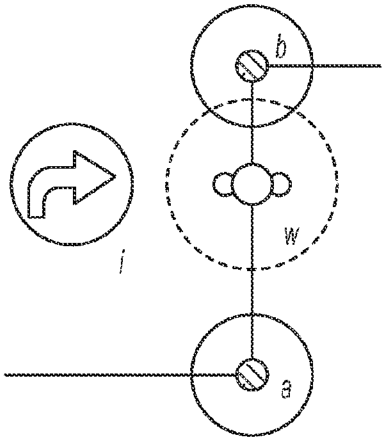
FIG. 9 is a schematic representation of a qualitative instruction being provided to a user in response to the user position relative to one or more waypoints in accordance with the present invention.
Figure 10:
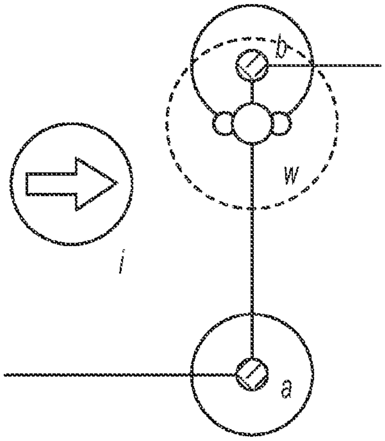
FIG. 10 is a schematic representation of a qualitative instruction being provided to a user in response to the user position relative to one or more waypoints in accordance with the present invention.

An example of the preferred method is shown schematically in FIGS. 8, 9 and 10. Each of these figures illustrates a user having a first CSEP w attempting to navigate to a location not shown, a first waypoint defining a second CSEP a, and a second waypoint defining a third CSEP b. The qualitative instruction, i, is represented as an arrow of varying dimension and direction.

As shown in FIG. 8, the first CSEP is disjointed from both the second CSEP and the third CSEP. Accordingly, the preferred method utilizes the orientation methodology to instruct the user as to the direction of the second waypoint. In this instance, a one-dimensional arrow is presented to indicate to the user that he or she is disjointed from at least the second waypoint. As the user approaches the second waypoint, the first CSEP begins to overlap with the third CSEP. As shown in FIG. 9, a sufficient degree of overlap, as defined according to the twenty-six topological relationships noted above, results in the instruction to the user being qualitatively modified. As shown, the instruction includes a two-dimensional arrow that instructs the user to continue forward and to anticipate making a right turn. In FIG. 10, a distinct degree of overlap has been determined according to the preferred method, and thus the instruction is further modified to instruct the user to immediately and currently change course. The sufficiency of the degree of overlap is determined according to the preferred method and the aforementioned twenty-six topological relations. As such, once the first CSEP sufficiently overlaps the third CSEP, then the user will be instructed to turn to his or her right and proceed in that direction. In the example shown, the instruction includes a one-dimensional arrow that is oriented to the user's right relative to the arrow shown in FIG. 8.

Although the foregoing example expresses the qualitative relative positions between the first CSEP and one or more waypoints using an arrow as a visual indicator, other suitable qualitative measures of the relative distances and orientations are also contemplated by the present invention. For example, the qualitative user position may be presented in the form of audible instructions, written instructions, maps and other visual indicators, mechanical vibrations, or a combination of the foregoing as to a preferred route and relative position. Alternatively, a user may be able to select between one or more forms of qualitative positional information, or the mobile device may be adapted to automatically select between one or more qualitative user position presentations in response to the density, size, frequency, or other attribute of the surrounding waypoints. In yet other alternative embodiments, mobile devices may be configured for users having one or more handicaps, such as blindness or deafness, in order to aid such as user in navigation.

In still other alternative embodiments, the user may be associated with a vehicle, vessel or other machine that includes the mobile device, possibly integrated therein. For example, if an aircraft is configured with a GPS receiver, then the methodology of the present invention can be utilized by a pilot, copilot or navigator to provide the user with the qualitative position of the aircraft relative to certain waypoints. Example waypoints may include airports, other aircraft, buildings, mountains and other obstructions, landmarks to aid in navigation, or restricted airspace. As noted, the dimension of the radius of any waypoint may vary depending upon its size or importance, thus the present invention can be readily utilized by aviation providers and government regulators to aid in navigation, prevent accidents, and restrict the movement of aircraft within proximal distance of certain spaces. Similar aspects of the present invention are equally applicable to maritime and automotive navigation and positioning methods.

The methodology of the present invention is preferably performed by a mobile geographic information system. The preferred mobile geographic information system includes a database containing geographic information including information related to a geographic feature and information relating to a first waypoint associated with the geographic feature and a mobile device in communication with the database. The preferred mobile device includes a controller communicable with the database and a position sensor for determining a user position associated with the mobile device. The mobile device may include any number of devices, such as a personal digital assistant (PDA), a laptop computer, a cellular or digital wireless telephone or smart telephone, a portable music player, or any other suitable electronic device. The preferred controller is adapted to receive information denoting the user position and, in combination with the geographic information relating to the geographic feature and the first waypoint, the preferred controller is adapted to instruct the user as to a qualitative relative position of the mobile device and the geographic feature in response to a predetermined topological relationship between the user position and the first waypoint associated with the geographic feature.

Figure 11:
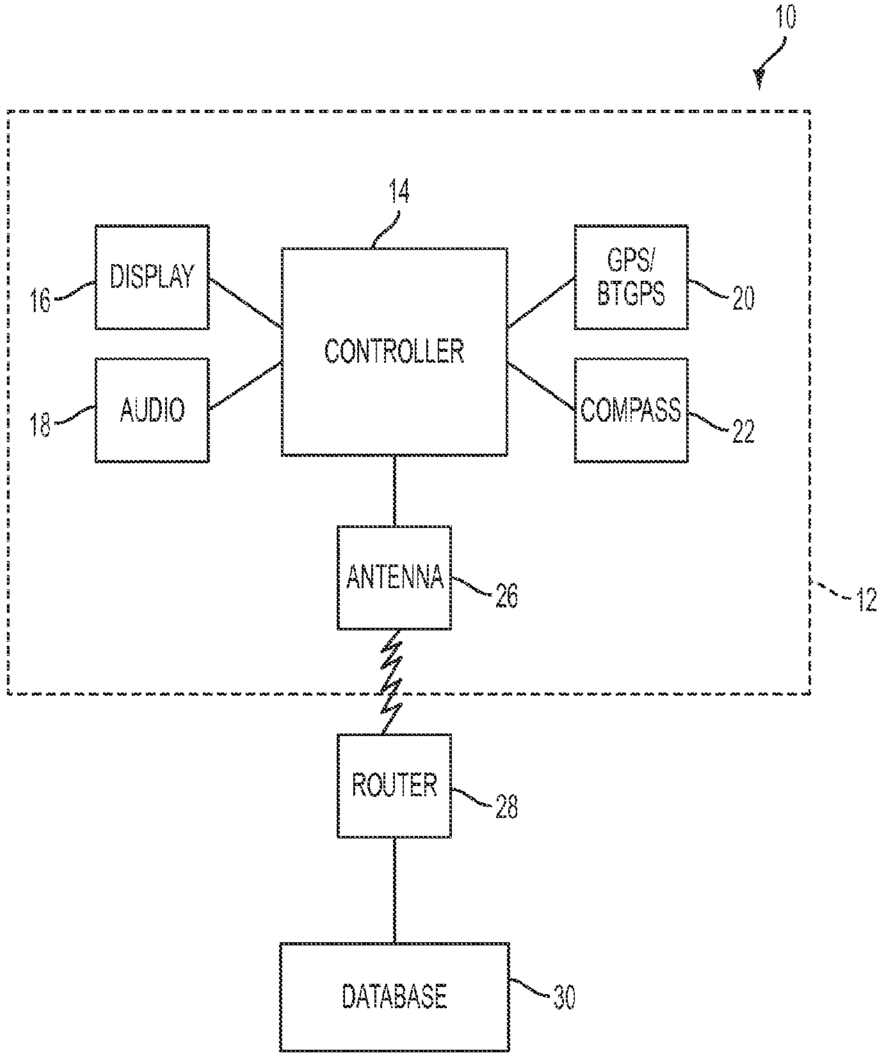
FIG. 11 is a schematic representation of a mobile geographic information system in accordance with the present invention.

As shown in FIG. 11, one alternative embodiment of the system 10 includes a mobile device 12 that is communicable with a database 30. The mobile device 12 functions to provide a user position associated with a user. The mobile device 12 includes a controller 14 that is connected to an antenna 26 that functions to communicate with a router 26 associated with the database 30. The database 30 includes geographic information including information related to a geographic feature and information relating to a first waypoint associated with the geographic feature. In alternative embodiments, the database 30 may be integrated into the mobile device 12, and in such instances the mobile device 12 need not include an antenna 26 and the database 30 need not be associated with a router 28. For example, the database 30 may be configured on a CD-ROM, DVD, or other suitable portable data storage device that the mobile device 12 is adapted to receive. Alternatively, the database 30 may be integrated into a memory unit (not shown) included in the mobile device 12 and connected with the controller 14, as shown in FIG. 12.

In the first alternative embodiment, the mobile device 12 includes a GPS device 20 that is adapted to provide a user position utilizing the methods described above. The GPS device 20 may be integrated into the mobile device 12, or it may be located external to the mobile device 12 but in communication therewith through wired or wireless means. The mobile device 12 of the first alternative embodiment further includes a display 16 and an audio output 18, such as speakers, a headphone jack or the like. The display 16 and the audio output 18 function to provide the user with the qualitative user position relative to one or more waypoints. Additionally, the mobile device 12 of the first alternative embodiment may include a compass 22 or other suitable orientation finding means connected to the controller 14. The compass functions to provide a user orientation associated with the mobile device 12. Alternatively, the user orientation may be determined through the GPS device 20 using historical movements and extrapolating a user orientation there from. In such instances, the mobile device 12 need not include a compass 22 for determining the user orientation.

Figure 12:
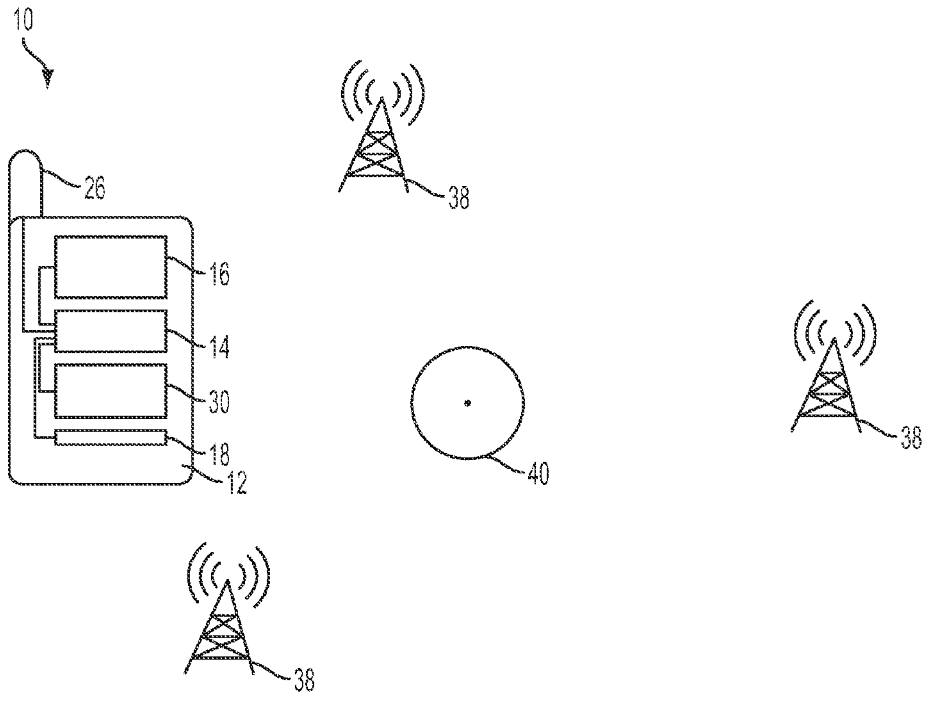
FIG. 12 is a schematic representation of a mobile geographic information system in accordance with the present invention.

In a second alternative embodiment, depicted in FIG. 12, the mobile device 12 is adapted to determine a user position using the antenna 26. The mobile device 12 of the second preferred embodiment includes a controller 14 that is connected to a display 16 and an audio output 18. As shown in FIG. 12, the mobile device 12 includes a database 30 integrated therein and connected to the controller 14. The database 30 includes geographic information including information related to a geographic feature and information relating to a first waypoint 40 associated with the geographic feature. As noted above, the first waypoint 40 includes a second CSEP defined about a second center point. Alternatively, the database 30 may be located remotely from the mobile device 12 an accessible through wireless means using the antenna 26, as described above with reference to FIG. 11.

In the second alternative embodiment, the mobile device 12 functions to provide a user position through triangulation of a wireless signal from one or more remote transmitters 38. For example, the mobile device 12 may include a wireless telephone or WiFi enabled device that is communicable with one or more remote transmitters 38. In this instance, the position of the mobile device 12, and by extension the user position, can be determined through the known process of triangulation. The user position, as noted above, includes a first CSEP extended about a first center point.

The preferred system 10 functions to determine the qualitative position of the user in response to a predetermined topological relationship between the first circular spatially extended point associated with the user and the second circular spatially extended point associated with the first waypoint. As noted above with reference to FIG. 7, there are twenty-six possible qualitative topological relationships between the first CSEP, which is shaded, and the second CSEP, which is not shaded. The twenty-six qualitative topological relationships can be further classified into eight distinct qualitative measurements of the relative positions of the first CSEP and the second CSEP. These eight qualitative measurements include a disjointed relationship, a meeting relationship, an overlapping relationship, a covering relationship, a covered by relationship, a containing relationship, and inside relationship and an equal relationship.

The preferred system 10 may be further adapted to aid a user in determining a navigable route to, from, or around a point of interest. To that end, the database 30 may further include a navigable route related to the geographic feature, the navigable route defined in part by the first waypoint and a second waypoint, wherein the second waypoint comprises a third circular spatially extended point. As noted above with respect to FIGS. 8, 9 and 10, the system 10 is adapted to instruct the user along the navigable route in response to the user orientation and a predetermined topological relationship between the user position and the second waypoint. Thus, as previously described, the predetermined topological relationship between the user position and the second waypoint includes a topological relationship between a first circular spatially extended point and the third circular spatially extended point.

The instructions and relative position provided by the system 10 to the user are preferably qualitative in nature. As noted above, the qualitative user position may be presented in the form of audible instructions, written instructions, maps and other visual indicators, mechanical vibrations, or a combination of the foregoing as to a preferred route and relative position. Alternatively, a user may be able to select between one or more forms of qualitative positional information, or the mobile device may be adapted to automatically select between one or more qualitative user position presentations in response to the density, size, frequency, or other attribute of the surrounding waypoints. In yet other alternative embodiments, mobile devices may be configured for users having one or more handicaps, such as blindness or deafness, in order to aid such as user in navigation.

Although described herein with particularity and referring to specific preferred embodiments and alternatives there from, the scope of the present invention should be understood to include various methods and systems not specifically noted above. In particular, one skilled in the art might readily devise methods and systems having trivial deviations from the embodiments described above without departing from the scope of the present invention. Accordingly, the present invention should be understood to include all that is recited in the following claims, including any equivalent steps, elements, limitations, methods and devices.

We claim:

1. A mobile geographic information system comprising:

a database containing geographic information including information related to at least one geographic feature and information relating to at least a first waypoint associated with the at least one geographic feature for traveling from a user position to a predetermined geographic location;

a mobile device for communicating with the database;

a controller integrated with the mobile device for communicating through the mobile device with the database and a position sensor for determining the user position associated with the mobile device, with the controller receiving information from the position sensor to indicate the user position and the controller determining a first circularly spatially extended point (CSEP) about the user position, the controller further determining a second CSEP about the at least first waypoint with a two dimensional size of the second CSEP being determined based on whether the at least first waypoint is fixed or mobile and the instructing a user as to a qualitative relative position of the mobile device and the at least one geographic feature in response to a predetermined topological relationship between the first CSEP about the user position and the second CSEP about the at least first waypoint to provide refined instructions for the user to proceed to the predetermined geographic location, with the qualitative relative position between the user position (A) and the at least first waypoint (B) being determined in response to a topological relationship selected from the group consisting of at least four (4) of the following topological relationships: a disjointing of A and B, a meeting of A and B, an overlap of A and B, a covering by A of B, a covering by B of A, a containment by A of B, a containment by B of A, or an equality between A and B, and changing the refined instructions with a changing of the qualitative relative position between the user position (A) and the first waypoint (B).

2. The system of claim 1 wherein the mobile device includes an orientation sensor to define a user orientation.

3. The system of claim 2 wherein the database further includes a navigable route related to the at least one geographic feature, the navigable route defined in part by the first waypoint and a second waypoint.

4. The system of claim 3 wherein the second waypoint comprises a third CSEP.

5. The system of claim 4 wherein the controller is further adapted to instruct the user along the navigable route in response to the user orientation and a topological relationship between the user position and the second waypoint.

6. The system of claim 5 wherein the topological relationship between the user position and the second waypoint includes a topological relationship between a first CSEP and the third CSEP.

7. The system of claim 1 wherein the mobile device includes the database.

8. The system of claim 1 wherein qualitative instructions to the user include at least one of the instructions distal, close, closer, or arrival.

9. A computer-implemented method for providing geographic information comprising:

inputting data representing a user position and determining a first circularly spatially extended point (CSEP) about the user position in response to the user position data;

determining at least a first waypoint associated with at least one geographic feature for traveling from a user position to a predetermined geographic location and determining a second CSEP about the at least first waypoint with a two dimensional size of the CSEP being determined based on whether the at least first waypoint is fixed or mobile; and generating a qualitative user position and refined instructions for a user to proceed to the predetermined geographic location relative to the at least one geographic feature in response to a topological relationship between the first CSEP (A) and the second CSEP (B), with the qualitative user position and refined instructions relative to the at least one geographic feature being determined in reference to the topological relationship selected from the group consisting of at least four (4) of the following topological relationships: including at least a disjointing of A and B, a meeting of A and B, an overlap of A and B, a covering by A of B, a covering by B of A, a containment by A of B, a containment by B of A, or an equality between A and B, with the refined instructions changing with a changing of the qualitative relative position between the first CSEP (A) and the second CSEP (B).

10. The method of claim 9 further comprising a step of inputting data regarding a user orientation.

11. The method of claim 9 further comprising the step of determining a second waypoint associated with a navigable route.

12. The method of claim 11 further comprising a step of determining a third CSEP about the second waypoint.

13. The method of claim 12 further comprising a step of instructing the user along the navigable route in response to a user orientation and a topological relationship between the use position and the second waypoint.

14. The method of claim 13 wherein the topological relationship between the user position and the second waypoint includes a topological relationship between the first CSEP and the third CSEP.

15. The method of claim 9 wherein the step of inputting data representing a user position includes a step of receiving data regarding a position of a mobile device.

16. The method of claim 15 wherein the step of receiving data regarding a position of a mobile device includes a step of receiving data from a global positioning system.

17. The method of claim 9 wherein the method further includes a step of generating qualitative instructions for that include at least one of the instructions distal, close, closer, or arrival.

* * * * *